US012619456B2

(12) United States Patent
Gerganov et al.

(10) Patent No.: US 12,619,456 B2
(45) Date of Patent: May 5, 2026

(54) REMOTE ATTESTATION OF WORKLOADS RUNNING IN VIRTUAL MACHINES

(71) Applicant: VMware LLC, Palo Alto, CA (US)

(72) Inventors: Radoslav Vladimirov Gerganov, Sofia (BG); Dentcho Ludmilov Bankov, Sofia (BG)

(73) Assignee: VMware LLC, Palo Alto, CA (US)

( * ) Notice: Subject to any disclaimer, the term of this patent is extended or adjusted under 35 U.S.C. 154(b) by 428 days.

(21) Appl. No.: 18/464,866

(22) Filed: Sep. 11, 2023

(65) Prior Publication Data

US 2025/0013483 A1      Jan. 9, 2025

Related U.S. Application Data

(60) Provisional application No. 63/511,828, filed on Jul. 3, 2023.

(51) Int. Cl.
*G06F 9/455* (2018.01)

(52) U.S. Cl.
CPC .................... *G06F 9/45558* (2013.01); *G06F 2009/45562* (2013.01); *G06F 2009/4557* (2013.01); *G06F 2009/45587* (2013.01)

(58) Field of Classification Search
CPC ....... G06F 9/45558; G06F 2009/45562; G06F 2009/4557; G06F 2009/45587
See application file for complete search history.

(56) References Cited

U.S. PATENT DOCUMENTS

| | | | |
|---|---|---|---|
| 2019/0268318 A1* | 8/2019 | Tsirkin .................... | G06F 21/44 |
| 2022/0222098 A1* | 7/2022 | Srivastava .......... | G06F 9/45558 |
| 2024/0089111 A1* | 3/2024 | Blum ...................... | G06F 21/57 |
| 2024/0311515 A1* | 9/2024 | Goodman .............. | G06F 21/64 |
| 2025/0088361 A1* | 3/2025 | Hui ........................ | H04L 9/3263 |

* cited by examiner

*Primary Examiner* — Ryan Bertram
(74) *Attorney, Agent, or Firm* — Kim & Stewart LLP

(57) ABSTRACT

In one set of embodiments, a computer system executing a virtual machine (VM) packaging tool can receive a reference to a container comprising one or more applications of a workload and a reference to an operating system (OS) kernel to be included in the workload. The computer system can inject an agent into the container that is configured to request execution of a hardware VM attestation function, combine contents of the container and the OS kernel into an image file, and compute a hash of the image file. The computer system can then generate a firmware for the workload that includes the hash.

21 Claims, 3 Drawing Sheets

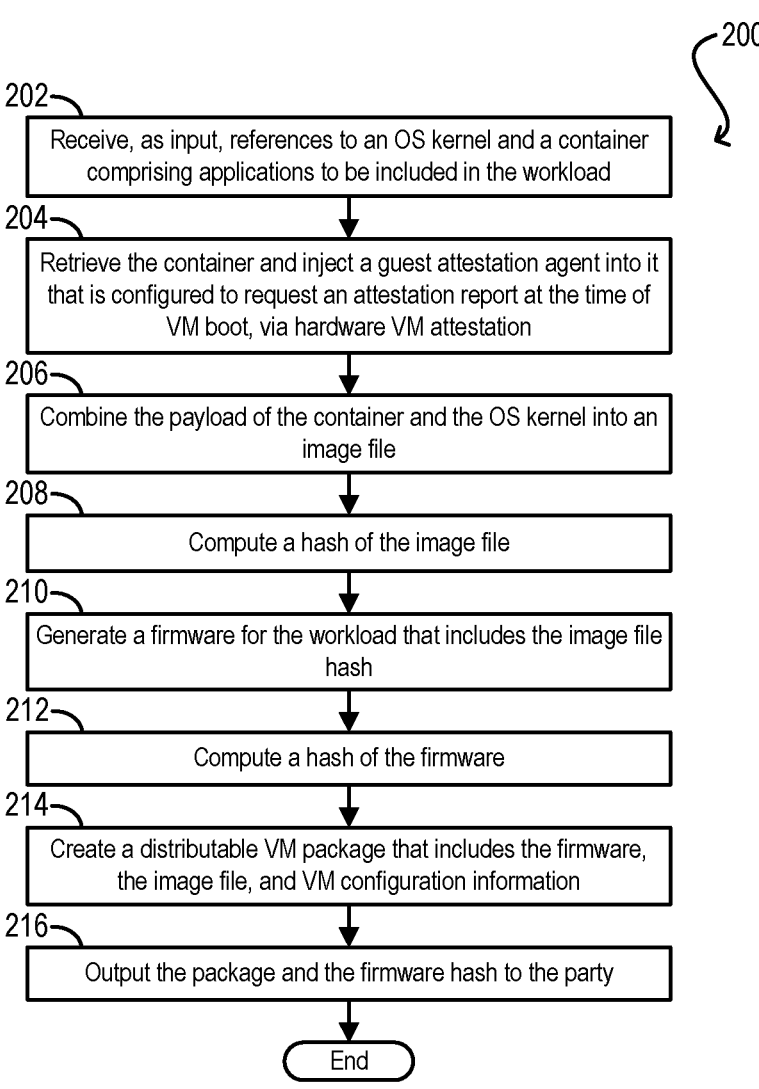

200

202 — Receive, as input, references to an OS kernel and a container comprising applications to be included in the workload 204 — Retrieve the container and inject a guest attestation agent into it that is configured to request an attestation report at the time of VM boot, via hardware VM attestation 206 — Combine the payload of the container and the OS kernel into an image file 208 — Compute a hash of the image file 210 — Generate a firmware for the workload that includes the image file hash 212 — Compute a hash of the firmware 214 — Create a distributable VM package that includes the firmware, the image file, and VM configuration information 216 — Output the package and the firmware hash to the party End

FIG. 2

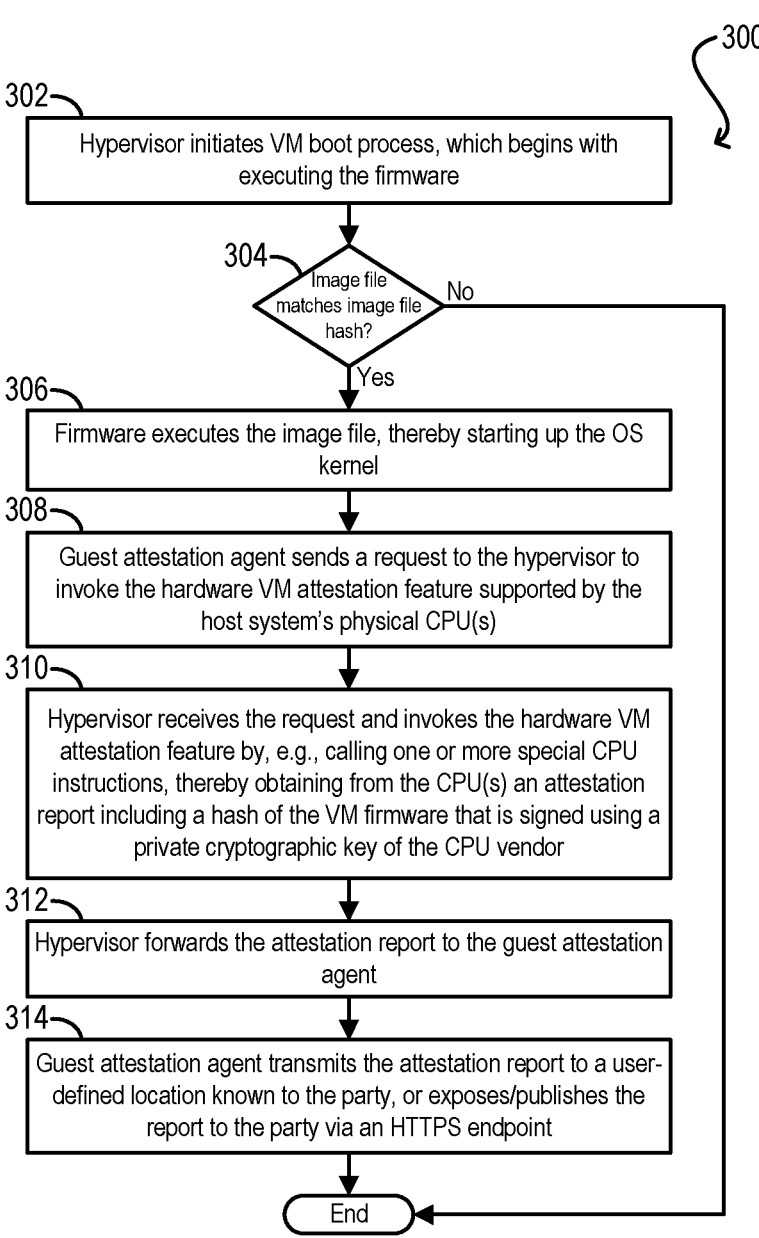

300

302
Hypervisor initiates VM boot process, which begins with executing the firmware 304
Image file matches image file hash?

No

Yes

306
Firmware executes the image file, thereby starting up the OS kernel

308
Guest attestation agent sends a request to the hypervisor to invoke the hardware VM attestation feature supported by the host system's physical CPU(s)

310
Hypervisor receives the request and invokes the hardware VM attestation feature by, e.g., calling one or more special CPU instructions, thereby obtaining from the CPU(s) an attestation report including a hash of the VM firmware that is signed using a private cryptographic key of the CPU vendor 312
Hypervisor forwards the attestation report to the guest attestation agent 314
Guest attestation agent transmits the attestation report to a user-defined location known to the party, or exposes/publishes the report to the party via an HTTPS endpoint End

FIG. 3

REMOTE ATTESTATION OF WORKLOADS RUNNING IN VIRTUAL MACHINES

CROSS-REFERENCES TO RELATED APPLICATIONS

The present application claims priority to U.S. Provisional Patent Application No. 63/511,828 filed Jul. 3, 2023 and entitled "Remote Attestation of Workloads Running in Virtual Machines." The entire contents of this provisional application are incorporated herein by reference for all purposes.

BACKGROUND

Unless otherwise indicated, the subject matter described in this section should not be construed as prior art to the claims of the present application and is not admitted as being prior art by inclusion in this section.

In recent years, it has become increasingly common for organizations to move their compute workloads from on-premises data centers to public clouds. Driving factors for this migration include increased workload performance (in terms of latency, throughput, etc.), improved workload resiliency/availability, and cost savings.

One significant concern with running a workload in a public cloud is security, or in other words ensuring that the workload is safe from threats and attacks that attempt to tamper with the workload or gain unauthorized access to confidential workload data. Major public cloud providers implement security measures at the infrastructure level in order to counter such threats/attacks, but these measures are not foolproof and are being constantly challenged by new and evolving attack techniques.

BRIEF DESCRIPTION OF THE DRAWINGS

FIG. 2 depicts a VM packaging tool workflow according to certain embodiments.

FIG. 3 depicts a VM boot workflow for enabling remote attestation according to certain embodiments.

DETAILED DESCRIPTION

Figure 1:
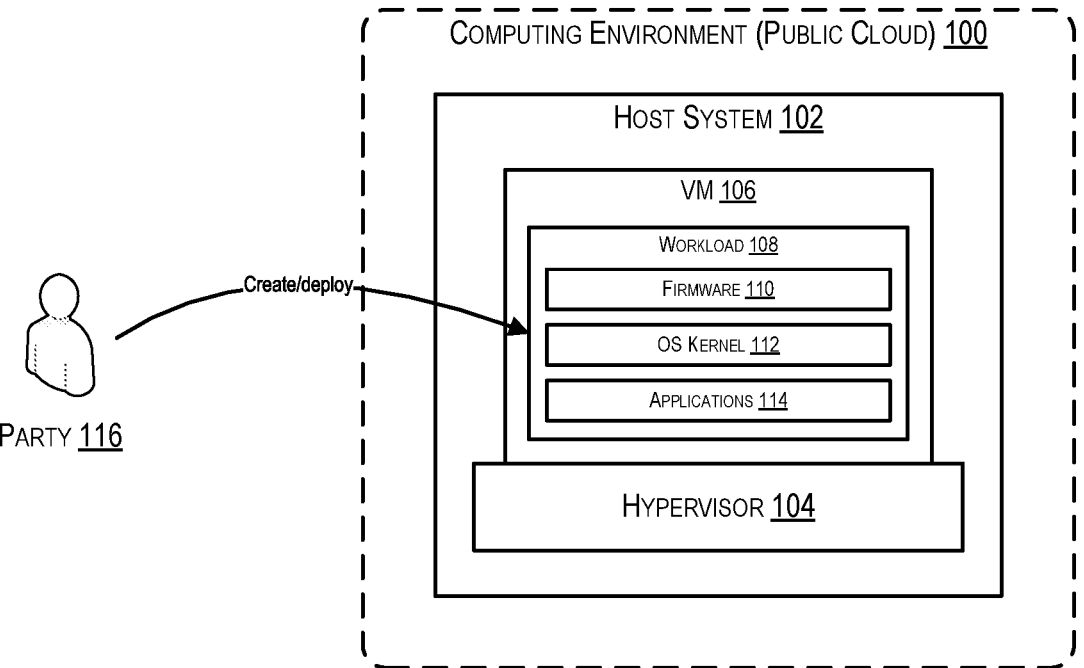
FIG. 1 depicts an example computing environment.

In the following description, for purposes of explanation, numerous examples and details are set forth in order to provide an understanding of various embodiments. It will be evident, however, to one skilled in the art that certain embodiments can be practiced without some of these details or can be practiced with modifications or equivalents thereof.

Embodiments of the present disclosure are directed to techniques for enabling remote attestation of workloads that are deployed via virtual machines (VMs) in computing environments such as public clouds. As used herein, a "workload" is a combination of firmware (e.g., Unified Extensible Firmware Interface (UEFI) firmware), an operating system (OS) kernel, and one or more user-level applications. "Remote attestation" involves providing, to a party associated with a deployed workload (e.g., the workload developer, administrator, or some other user/entity), cryptographic proof pertaining to the workload's runtime integrity and confidentiality.

For example, consider a scenario in which a party P packages a workload W into a VM and deploys the VM on a host system H of a public cloud C. In this scenario, certain embodiments of the present disclosure enable party P to obtain an attestation report comprising cryptographic proof that:

1. workload W is running unmodified on H (i.e., W has not been tampered with); and
2. the runtime state of W held in H's system memory is encrypted, such that no one (including the provider of public cloud C) can view or access that runtime state.

With this cryptographic proof, party P can be assured that deployed workload W is unaltered and its contents cannot be snooped/leaked, even if the provider of public cloud C is untrusted or is compromised.

1. Example Environment and Solution Overview

To provide context for the embodiments described herein, FIG. 1 depicts an example computing environment 100 comprising a host system 102. In this figure, computing environment 100 is specifically a public cloud such as Amazon AWS, Microsoft Azure, Google Cloud, or the like. In alternative embodiments, computing environment 100 may be a hybrid cloud or a private cloud. Although only a single host system is shown for illustration purposes, any number of host systems may be included within environment 100.

Host system 102 runs a hypervisor 104 that provides an execution environment for a VM 106. VM 106 in turn runs a workload 108 (comprising a firmware 110, an OS kernel 112, and a set of applications 114) created/deployed by a party 116. For example, party 116 may be a user within an organization that is a customer/tenant of computing environment 100, and workload 108 may include software applications or services that are designed to meet the business objectives of the organization.

As noted in the Background section, one challenge with running a workload in a public cloud is ensuring/verifying the security of the workload. Public clouds are inherently multi-tenant environments, which means that they are susceptible to attacks by one tenant on the workloads of other tenants. Further, the public cloud provider itself may be compromised by internal or external threat actors, who can potentially take control of certain components of the public cloud infrastructure (such as the host hypervisors) to disrupt, tamper with, and/or snoop on customer workloads.

To address the foregoing and other related problems, embodiments of the present disclosure provide a remote attestation solution that enables parties such as party 116 of FIG. 1 to verify that the workloads they have deployed via VMs on a public cloud (or any other computing environment) are secure. In various embodiments, this solution leverages two hardware-level abilities of modern CPUs: the ability to encrypt a VM's runtime state (also known the ability to run the VM within a secure enclave or trusted execution environment (TEE)) and the ability to generate an attestation report regarding a VM's integrity. The former is supported by recent AMD CPUs via a feature called Secure Encrypted Virtualization or SEV and is generically referred to herein as "hardware VM encryption," The latter is supported by recent AMD CPUs via a feature called Secure Nested Paging or SEV-SNP and is generically referred to herein as "hardware VM attestation." Additional information regarding SEV and SEV-SNP can be found at https://www.amd.com/en/processors/amd-secure-encrypted-virtualization and https://www.amd.com/content/dam/amd/en/documents/developer/lss-snp-attestation.pdf respectively. The entire contents of these linked resources are incorporated herein by reference for all purposes.

One limitation with existing hardware VM attestation implementations including SEV-SNP is that they are designed to generate a signed hash (i.e., checksum) of a VM's firmware only (which can be compared with a known, correct hash of the firmware to verify whether the VM has been tampered with or not). As a result, two VMs that have the same firmware but different OS kernels and/or application code will produce the same signed hash, which means this feature cannot distinguish between such VMs and thus cannot be used to verify the integrity of their overall workloads.

To overcome this limitation, embodiments of the present disclosure include, among other things, a novel VM packaging tool that can be made available to a party that wishes to deploy their workloads as VMs in a target computing environment. At a high level, this tool can create for each such workload a custom firmware that is uniquely associated with the workload's other contents (in other words, its OS kernel and/or applications). For example, the tool can compute a hash of the workload's OS kernel and/or application code and insert this hash into the custom firmware. The tool can then bundle together the custom firmware with the remainder of the workload into a distributable VM package (e.g., a virtual appliance (OVA) file) and the package can be subsequently deployed and run as a VM on a host system of the target environment.

With this general approach, the firmware of each deployed VM will be effectively bound/tied to the other portions of the VM's workload (e.g., by virtue of including a hash of those other portions). This means that VMs having the same firmware but different OS kernels and/or applications will necessarily produce different signed hashes via hardware VM attestation, even though this hardware feature only measures (i.e., hashes) the firmware. Accordingly, embodiments of the present disclosure advantageously allow hardware VM attestation to be leveraged for remote attestation of entire VM workloads, despite its inherent limitations.

The remainder of this disclosure details workflows for packaging a workload using the VM packaging tool described above and for enabling remote attestation of that workload via hardware VM attestation at the time of VM boot. It should be appreciated that FIG. 1 is illustrative and not intended to limit embodiments of the present disclosure. For example, although FIG. 1 depict a particular arrangement of components in computing environment 100, other arrangements are possible (e.g., the functionality attributed to a particular component may be split into multiple components, components may be combined, etc.). One of ordinary skill in the art will recognize other variations, modifications, and alternatives.

2. VM Packaging Tool Workflow

FIG. 2 depicts a workflow 200 that may be executed by the VM packaging tool of the present disclosure for preparing workload 108 of party 116 for deployment via VM 106 (as shown in FIG. 1) in a manner that supports remote attestation of the workload according to certain embodiments.

Starting with step 202, the tool can receive as input references to an OS kernel and a container (or some other similar software package) comprising applications to be included in workload 108.

At step 204, the tool can retrieve the container and inject a guest attestation agent into it that is configured to, among other things, request an attestation report for VM 106 at the time of VM boot, via hardware VM attestation. The operation of this agent is described in further detail in the next section.

At step 206, the tool can combine the payload of the container (which includes the injected guest attestation agent) and the OS kernel into an image file. This image file is an executable file, such as a UEFI binary, that can be run by UEFI firmware to boot the OS kernel included therein.

At steps 208 and 210, the tool can compute a hash (e.g., SHA256 checksum, etc.) of the image file and generate a firmware for workload 108 (e.g., in the form of a UEFI firmware ROM file) that includes the image file hash. In this manner, the tool can customize the firmware to reflect the contents of workload 108's OS kernel and applications.

At step 212, the tool can compute a hash of the firmware.

At step 214, the tool can create a distributable VM package (e.g., virtual appliance (OVA) file) that includes the firmware, the image file, and VM configuration information (e.g., a VMX file) for VM 106. This VM configuration information can require, among other things, that the VM's runtime state be encrypted using hardware VM encryption.

Finally, at step 216, the tool can output the distributable VM package and the firmware hash computed at step 212 to party 116. Party 116 (or some other entity) can thereafter deploy the package on host system 102 in computing environment 100, which will cause VM 106 comprising workload 108 to be powered-on and run by hypervisor 104.

3. VM Boot Workflow

FIG. 3 depicts a workflow 300 that may be executed on host system 102 of FIG. 1 at the time VM 106 is powered-on there to enable remote attestation of workload 108 via hardware VM attestation according to certain embodiments. Workflow 300 assumes that workload 108 is configured as described in workflow 200 of FIG. 2 (e.g., includes a firmware with an embedded hash of the workload's OS kernel/applications and a guest attestation agent). Workflow 300 further assumes that the physical CPUs and hypervisor 104 of host system 102 support both hardware VM encryption and hardware VM attestation.

At step 302, hypervisor 104 can initiate the boot process for booting up VM 106, which begins with executing the firmware. Upon being executed, the firmware can verify that the contents of the image file match the embedded hash (step 304). If this is true, the firmware can execute the image file, thereby starting up the OS kernel (step 306); otherwise, the workflow can end. This check guarantees that the image file will not be executed if it has been tampered with.

Once the OS kernel has been initiated, the previously injected guest attestation agent can send a request to hypervisor 104 to invoke the hardware VM attestation feature supported by host system 102's physical CPU(s) (step 308).

At step 310, hypervisor 104 can receive the request and invoke the hardware VM attestation feature by, e.g., calling one or more special CPU instructions, which causes the hypervisor to obtain from the CPU(s) an attestation report including a hash of VM 106's firmware that is signed using a private cryptographic key owned by the CPU vendor. Hypervisor 104 can then forward the attestation report to the guest attestation agent (step 312).

Finally, upon receiving the attestation report from hypervisor 104, the guest attestation agent can transmit the report to a user-defined location known to party 116, or alternatively can expose/publish the report to party 116 via, e.g., a Hypertext Transfer Protocol Secure (HTTPS) endpoint (step 314). Party 116 can subsequently retrieve the attestation report, confirm that the firmware hash included therein is signed by the CPU vendor, and verify that the firmware hash matches the firmware hash output by the VM packaging tool. Assuming this verification is successful, party 116 can conclude that the entirety of workload 108 running within VM 106 is unmodified and secure.

4. Other Aspects

4.1 Third-Party Verification

In some embodiments, rather than having party 116 verify the attestation report themselves, a trusted third-party service can access the attestation report, verify it, and provide a cryptographically signed verification result to party 116. Party 116 can then verify the signed verification result using, e.g., a public key of the third-party service.

4.2 Attestation of VM Persistent Data

The approach described in the previous sections enables remote attestation of workload code running within a VM but cannot attest to the integrity or confidentiality of persistent data accessed by that code during runtime (e.g., a virtual disk).

To address this, in certain embodiments workload 108 mentioned above can be configured to (1) generate one or more storage encryption/decryption keys based on hashes of the workload's firmware and OS kernel that are generated by a virtual trusted platform module (TPM) of VM 106 via a process known as secure boot/measured boot, and (2) use these key(s) to encrypt and decrypt the virtual disks that are accessed by workload 108. With this mechanism in place, if party 116 successfully verifies the attestation report exposed by the guest attestation agent, party 116 can also be assured that workload 108's persistent data is not tampered with and secure.

It should be noted that this mechanism requires that VM 106 include a virtual TPU device in order to generate the hashes used to create the storage encryption/decryption key(s). This can be achieved by configuring the VM packaging tool to specify such a device in the VMX file of the distributable VM package that is output by the tool.

Certain embodiments described herein can employ various computer-implemented operations involving data stored in computer systems. For example, these operations can require physical manipulation of physical quantities-usually, though not necessarily, these quantities take the form of electrical or magnetic signals, where they (or representations of them) are capable of being stored, transferred, combined, compared, or otherwise manipulated. Such manipulations are often referred to in terms such as producing, identifying, determining, comparing, etc. Any operations described herein that form part of one or more embodiments can be useful machine operations.

Further, one or more embodiments can relate to a device or an apparatus for performing the foregoing operations. The apparatus can be specially constructed for specific required purposes, or it can be a generic computer system comprising one or more general purpose processors (e.g., Intel or AMD x86 processors) selectively activated or configured by program code stored in the computer system. In particular, various generic computer systems may be used with computer programs written in accordance with the teachings herein, or it may be more convenient to construct a more specialized apparatus to perform the required operations. The various embodiments described herein can be practiced with other computer system configurations including handheld devices, microprocessor systems, microprocessor-based or programmable consumer electronics, minicomputers, mainframe computers, and the like.

Yet further, one or more embodiments can be implemented as one or more computer programs or as one or more computer program modules embodied in one or more non-transitory computer readable storage media. The term non-transitory computer readable storage medium refers to any storage device, based on any existing or subsequently developed technology, that can store data and/or computer programs in a non-transitory state for access by a computer system. Examples of non-transitory computer readable media include a hard drive, network attached storage (NAS), read-only memory, random-access memory, flash-based nonvolatile memory (e.g., a flash memory card or a solid state disk), persistent memory, NVMe device, a CD (Compact Disc) (e.g., CD-ROM, CD-R, CD-RW, etc.), a DVD (Digital Versatile Disc), a magnetic tape, and other optical and non-optical data storage devices. The non-transitory computer readable media can also be distributed over a network coupled computer system so that the computer readable code is stored and executed in a distributed fashion.

In addition, while certain virtualization methods referenced herein have generally assumed that virtual machines present interfaces consistent with a particular hardware system, persons of ordinary skill in the art will recognize that the methods referenced can be used in conjunction with virtualizations that do not correspond directly to any particular hardware system. Virtualization systems in accordance with the various embodiments, implemented as hosted embodiments, non-hosted embodiments or as embodiments that tend to blur distinctions between the two, are all envisioned. Furthermore, certain virtualization operations can be wholly or partially implemented in hardware.

Many variations, modifications, additions, and improvements are possible, regardless the degree of virtualization. The virtualization software can therefore include components of a host, console, or guest operating system that performs virtualization functions. Plural instances can be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the present disclosure. In general, structures and functionality presented as separate components in exemplary configurations can be implemented as a combined structure or component. Similarly, structures and functionality presented as a single component can be implemented as separate components.

As used in the description herein and throughout the claims that follow, "a," "an," and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. These examples and embodiments should not be deemed to be the only embodiments and are presented to illustrate the flexibility and advantages of particular embodiments as defined by the following claims. Other arrangements, embodiments, implementations, and equivalents can be employed without departing from the scope hereof as defined by the claims.

What is claimed is:

1. A method comprising:

receiving, by a computer system executing a virtual machine (VM) packaging tool, a reference to a container comprising one or more applications of a workload and a reference to an operating system (OS) kernel to be included in the workload;

injecting, by the computer system, an agent into the container configured to request execution of a hardware VM attestation function;

subsequently to the injecting, combining, by the computer system, contents of the container and the OS kernel into an image file;

computing, by the computer system, a first hash of the image file; and generating, by the computer system, a firmware for the workload that includes the first hash.

2. The method of claim 1 further comprising:

computing a second hash of the firmware;

creating a distributable VM package for deploying the workload as a VM, the distributable VM package including the firmware, the image file, and VM configuration information; and providing the second hash and the distributable VM package to a party associated with the workload.

3. The method of claim 2 wherein the VM configuration information includes a requirement that the VM is encrypted using hardware VM encryption when run.

4. The method of claim 2 wherein at a time the VM is powered-on on a host system of a computing environment, the agent submits a request to a hypervisor of the host system to execute the hardware VM attestation function.

5. The method of claim 4 wherein the computing environment is a public cloud.

6. The method of claim 4 wherein in response to submitting the request, the agent:

receives an attestation report including a third hash signed using a private key associated with a vendor of one or more central processing units (CPUs) of the host system; and makes the attestation report available to the party.

7. The method of claim 4 wherein the VM is associated with one or more virtual disks, and wherein the VM:

generates one or more storage encryption keys based on hashes of the firmware and the OS kernel computed by a virtual trusted platform module (TPM) of the VM; and uses the one or more storage encryption keys to encrypt the one or more virtual disks.

8. A non-transitory computer readable storage medium having stored thereon program code executable by a computer system, the program code causing the computer system to execute a method comprising:

receiving a reference to a container comprising one or more applications of a workload and a reference to an operating system (OS) kernel to be included in the workload;

injecting an agent into the container configured to request execution of a hardware virtual machine (VM) attestation function;

subsequently to the injecting, combining contents of the container and the OS kernel into an image file;

computing a first hash of the image file; and generating a firmware for the workload that includes the first hash.

9. The non-transitory computer readable storage medium of claim 8 wherein the method further comprises:

computing a second hash of the firmware;

creating a distributable VM package for deploying the workload as a VM, the distributable VM package including the firmware, the image file, and VM configuration information; and providing the second hash and the distributable VM package to a party associated with the workload.

10. The non-transitory computer readable storage medium of claim 9 wherein the VM configuration information includes a requirement that the VM is encrypted using hardware VM encryption when run.

11. The non-transitory computer readable storage medium of claim 9 wherein at a time the VM is powered-on on a host system of a computing environment, the agent submits a request to a hypervisor of the host system to execute the hardware VM attestation function.

12. The non-transitory computer readable storage medium of claim 11 wherein the computing environment is a public cloud.

13. The non-transitory computer readable storage medium of claim 11 wherein in response to submitting the request, the agent:

receives an attestation report including a third hash signed using a private key associated with a vendor of one or more central processing units (CPUs) of the host system; and makes the attestation report available to the party.

14. The non-transitory computer readable storage medium of claim 11 wherein the VM is associated with one or more virtual disks, and wherein the VM:

generates one or more storage encryption keys based on hashes of the firmware and the OS kernel computed by a virtual trusted platform module (TPM) of the VM; and uses the one or more storage encryption keys to encrypt the one or more virtual disks.

15. A computer system comprising:

a processor; and a non-transitory computer readable medium having stored thereon program code that, when executed by the processor, causes the processor to:

receive a reference to a container comprising one or more applications of a workload and a reference to an operating system (OS) kernel to be included in the workload;

inject an agent into the container configured to request execution of a hardware virtual machine (VM) attestation function;

subsequently to the injecting, combine contents of the container and the OS kernel into an image file;

compute a first hash of the image file; and generate a firmware for the workload that includes the first hash.

16. The computer system of claim 15 wherein the program code further causes the processor to:

compute a second hash of the firmware;

create a distributable VM package for deploying the workload as a VM, the distributable VM package including the firmware, the image file, and VM configuration information; and provide the second hash and the distributable VM package to a party associated with the workload.

17. The computer system of claim 16 wherein the VM configuration information includes a requirement that the VM is encrypted using hardware VM encryption when run.

18. The computer system of claim 16 wherein at a time the VM is powered-on on a host system of a computing environment, the agent submits a request to a hypervisor of the host system to execute the hardware VM attestation function.

19. The computer system of claim 18 wherein the computing environment is a public cloud.

20. The computer system of claim 18 wherein in response to submitting the request, the agent:

receives an attestation report including a third hash signed using a private key associated with a vendor of one or more central processing units (CPUs) of the host system; and makes the attestation report available to the party.

21. The computer system of claim 18 wherein the VM is associated with one or more virtual disks, and wherein the VM:

generates one or more storage encryption keys based on hashes of the firmware and the OS kernel computed by a virtual trusted platform module (TPM) of the VM; and uses the one or more storage encryption keys to encrypt the one or more virtual disks.

\* \* \* \* \*